US012775608B1

(12) United States Patent
Shiflett et al.

(10) Patent No.: US 12,775,608 B1
(45) Date of Patent: Oct. 27, 2026

(54) GENERATION AND STORAGE OF DATA RELATIONSHIPS

(71) Applicant: Qintel, LLC, Pittsburgh, PA (US)

(72) Inventors: John Paul Shiflett, Seven Fields, PA (US); Kevin Robert Moore, New Hartford, NY (US); Matthew Karl Geiger, Austin, TX (US)

(73) Assignee: Qintel, LLC, Pittsburgh, PA (US)

( * ) Notice: Subject to any disclaimer, the term of this patent is extended or adjusted under 35 U.S.C. 154(b) by 0 days.

(21) Appl. No.: 19/272,443

(22) Filed: Jul. 17, 2025

Related U.S. Application Data

(63) Continuation of application No. 17/825,716, filed on May 26, 2022, now Pat. No. 12,373,416.

(51) Int. Cl.
*G06F 16/23* (2019.01)
*G06F 16/28* (2019.01)

(52) U.S. Cl.
CPC ...... *G06F 16/2315* (2019.01); *G06F 16/2358* (2019.01); *G06F 16/2365* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 6,343,295 | B1 | 1/2002 | MacLeod et al. |
| 11,003,645 | B1 | 5/2021 | Thompson et al. |
| 11,226,994 | B2 | 1/2022 | Krishnamacharya |
| 11,392,578 | B1 | 7/2022 | James et al. |
| 2010/0161575 | A1 | 6/2010 | Basso et al. |
| 2014/0114907 | A1 | 4/2014 | Kozina et al. |
| 2015/0356123 | A1 | 12/2015 | Gorelik |
| 2018/0129699 | A1 | 5/2018 | Gould et al. |
| 2018/0349365 | A1 | 12/2018 | McRaven et al. |
| 2020/0210427 | A1 | 7/2020 | Dugan et al. |

*Primary Examiner* — James Trujillo
*Assistant Examiner* — John J Morris
(74) *Attorney, Agent, or Firm* — FERENCE & ASSOCIATES LLC

(57) ABSTRACT

One embodiment provides a method for identifying and storing relationships between source data and derivative data. A data relationship identification system identifies derivative data generated from source data. When the derivative data is generated, an identification of the source data corresponding to the derivative data is added to the derivative data. The data relationship identification system accesses the identification of the source data and associates the derivative data with the source data based upon the identification. The association of the derivative data with the source data is stored within a data store of the data relationship identification system.

16 Claims, 3 Drawing Sheets

GENERATION AND STORAGE OF DATA RELATIONSHIPS

CROSS REFERENCE TO RELATED APPLICATION

This application is a continuation application of co-pending U.S. patent application Ser. No. 17/825,716, filed May 26, 2022, entitled "GENERATION AND STORAGE OF DATA RELATIONSHIPS," the content of which is incorporated herein by reference as if set forth in its entirety.

BACKGROUND

Large amounts of digital data are consumed, processed, analyzed, generated, and the like. Manipulating data results in derivative data being generated. Derivative data is data that is created from source data and is different from the source data in some way. The difference can be a very minor difference, for example, a different save date, a different storage location, and/or the like. The difference may also be more substantial, for example, the source data has been analyzed and processed, thereby resulting in the derivative data which is different from the source data. The derivative data may also be manipulated, which results in an additional layer of changes between the second-generation derivative data and the original source data. Through different manipulations and multiple generations of derivative data generation, the source data may no longer be identifiable from the derivative data itself, meaning simply looking at the derivative data does not provide insight into the original source data from which the derivative data originated.

BRIEF SUMMARY

In summary, one aspect provides a method for identifying and storing relationships between source data and derivative data, the method including: identifying, using a data relationship identification system, derivative data generated from source data, wherein, when the derivative data is generated, an identification of the source data corresponding to the derivative data is added to the derivative data; accessing, using the data relationship identification system, the identification of the source data and associating the derivative data with the source data based upon the identification; and storing, within a data store of the data relationship identification system, the association of the derivative data with the source data.

Another aspect provides a system for identifying and storing relationships between source data and derivative data, the system including: a processor; a memory device that stores instructions that, when executed by the processor, causes the system to: identify, using a data relationship identification system, derivative data generated from source data, wherein, when the derivative data is generated, an identification of the source data corresponding to the derivative data is added to the derivative data; access, using the data relationship identification system, the identification of the source data and associating the derivative data with the source data based upon the identification; and store, within a data store of the data relationship identification system, the association of the derivative data with the source data.

A further aspect provides a product for identifying and storing relationships between source data and derivative data, the product including: a computer-readable storage device that stores executable code that, when executed by a processor, causes the product to: identify, using a data relationship identification system, derivative data generated from source data, wherein, when the derivative data is generated, an identification of the source data corresponding to the derivative data is added to the derivative data; access, using the data relationship identification system, the identification of the source data and associating the derivative data with the source data based upon the identification; and store, within a data store of the data relationship identification system, the association of the derivative data with the source data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
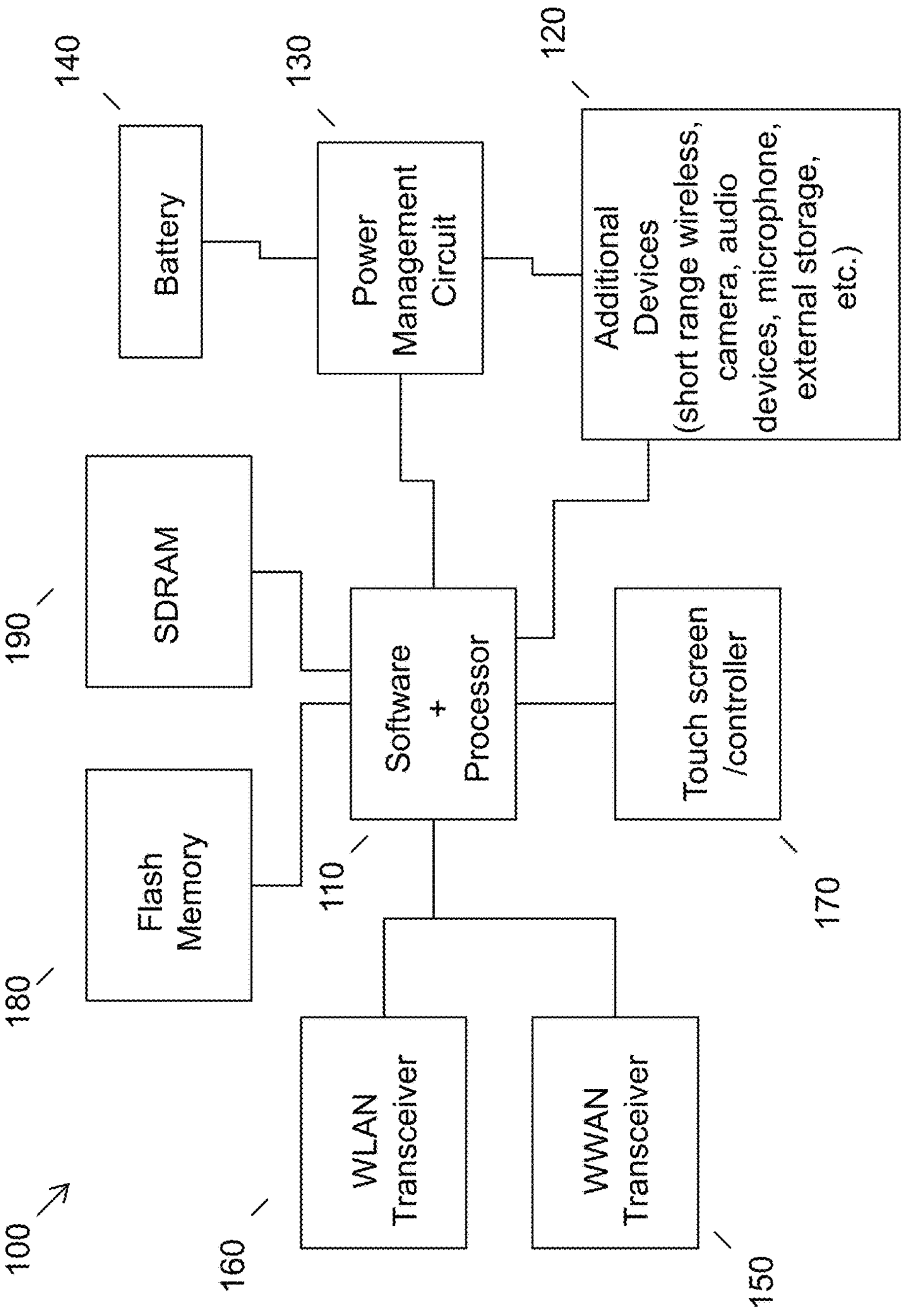
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As data is manipulated and changed from one version to another, it can be difficult to identify a source of the derivative data. Tracing a derivative data back to the original source data, particularly if the derivative data is a second, third, fourth, or subsequent generation of data, is difficult if not impossible with conventional techniques. Depending on how the data is modified, an application where the data is changed may superficially keep track of different versions of the data. For example, in a word processing application, the word processing application may keep track of previous versions of a document for a short period of time. However, this works by storing a temporary file that includes the prior version in a data storage location of the application and is typically associated through the name of the file. There is nothing about the document versions stored with the document itself. Other conventional applications that manipulate data may work similarly.

While an application may allow some tracking of different versions of data, the same tracking ability is not generally provided for more complex data processing systems. In the data processing systems, the data is processed and analyzed by a processing component to generate an output, which is its own form of data. This output is a type of derivative data that was derived from the source data. However, the processing and analysis to generate the output typically results in completely new data, not a version of the original source data, as in the previously mentioned applications. Additionally, the derivative data is generally stored in a different storage or format from the source data. This means that there is nothing in the derivative data that would identify the source data from which the derivative data came. Accordingly, the derivative data loses context of its source data when it is processed in a data processing system. Any information about the source data that may have been gleanable from the derivative data becomes even more obfuscated as new generations of derivative data are created from the derivative data created from the source data.

Accordingly, the described system and method provides a technique for identifying and storing relationships between source data and derivative data through accessing identifications or source data added to the derivative data. The data relationship identification system identifies derivative data generated from source data. Identifying the derivative data may include utilizing a central management system that tracks data as it progresses through a data processing system. As new data is generated from data, the central management system can identify that derivative data has been generated. During the generation of the derivative data, an identification of the source data corresponding to the derivative data is added to the derivative data. For example, as the derivative data is being generated or after the derivative data is generated, the data relationship identification system may add metadata to the derivative data that identifies the source data from which the derivative data was generated.

The data relationship identification system accesses the identification of the source data contained within the derivative data and associates the derivative data with the source data based upon the identification. The association is stored within a data store of the data relationship identification system, thereby identifying the derivative data has a relationship to the source data and also identifying the relationship. As the data associations are stored within the data store, the data relationship identification system can identify not only direct relationships between derivative data and source data, but can also infer relationships or identify indirect relationships between data. For example, the data relationship identification system can infer relationships between two derivative data, two source data, derivative data and source data where the derivative data is not a derivative of the source data, and/or the like. The data relationship identification system can also infer relationships between processes, components, systems, and/or the like, from the relationships contained within the data store.

Therefore, a system provides a technical improvement over traditional methods for data storage and tracking. When derivative data is generated in a data processing system that is used in conjunction with the described system, information is added to the derivative data that allows the system and a user to identify a source of the derivative data. Thus, a lineage can be created for derivative data that allows for tracing the lineage data back to an original source data, even if the derivative data is a second, third, fourth, or subsequent generation derivative data. The traditional techniques do not provide such derivative data tracing, instead losing any source data identification when generating the derivative data.

Additionally, since the traditional systems do not provide for derivative data tracing, traditional systems do not allow for features or functions that are based upon derivative data tracing. For example, the described system, using the derivative data lineage creation, allows for inferring relationships between data not having a direct relationship, inferring relationships between processes, components, systems, and/or the like, that are used for generating derivative data, verifying an accuracy of derivative data, and the like, which is not possible using conventional systems since they do not provide some lineage tracking and storage. Thus, the described system and method provides functionality that is not contemplated with conventional systems and allows for the generation of a lineage tree that identifies relationships between data, processes, systems, components, and the like.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/ rendering. System 100 also typically includes various memory devices, for example flash memory 180 and synchronous dynamic random-access memory (SDRAM) 190.

Figure 2:
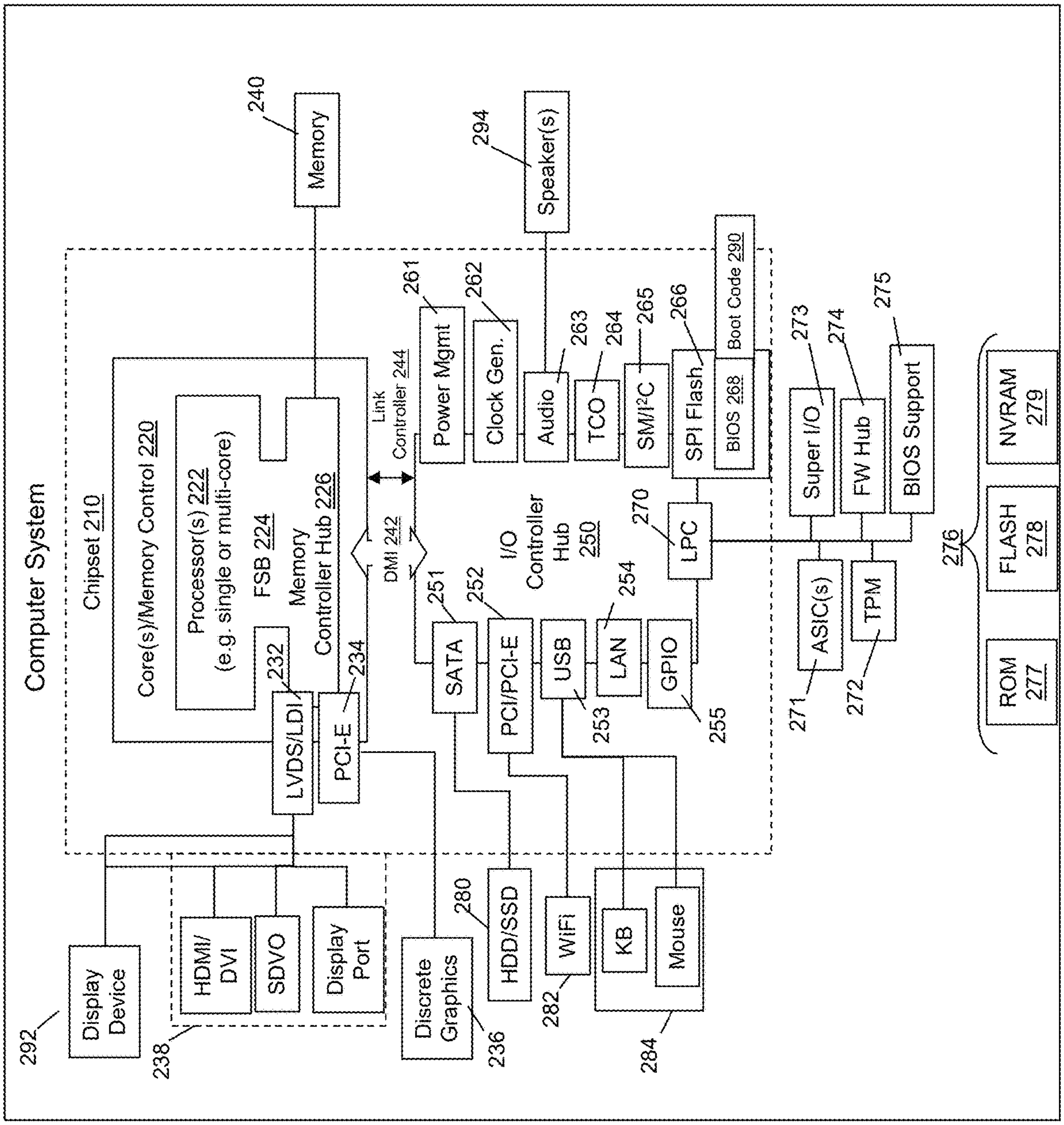
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems for data storage. For example, the circuitry outlined in FIG. 1 may be implemented in a tablet or smart phone embodiment, whereas the circuitry outlined in FIG. 2 may be implemented in a personal computer embodiment.

Figure 3:
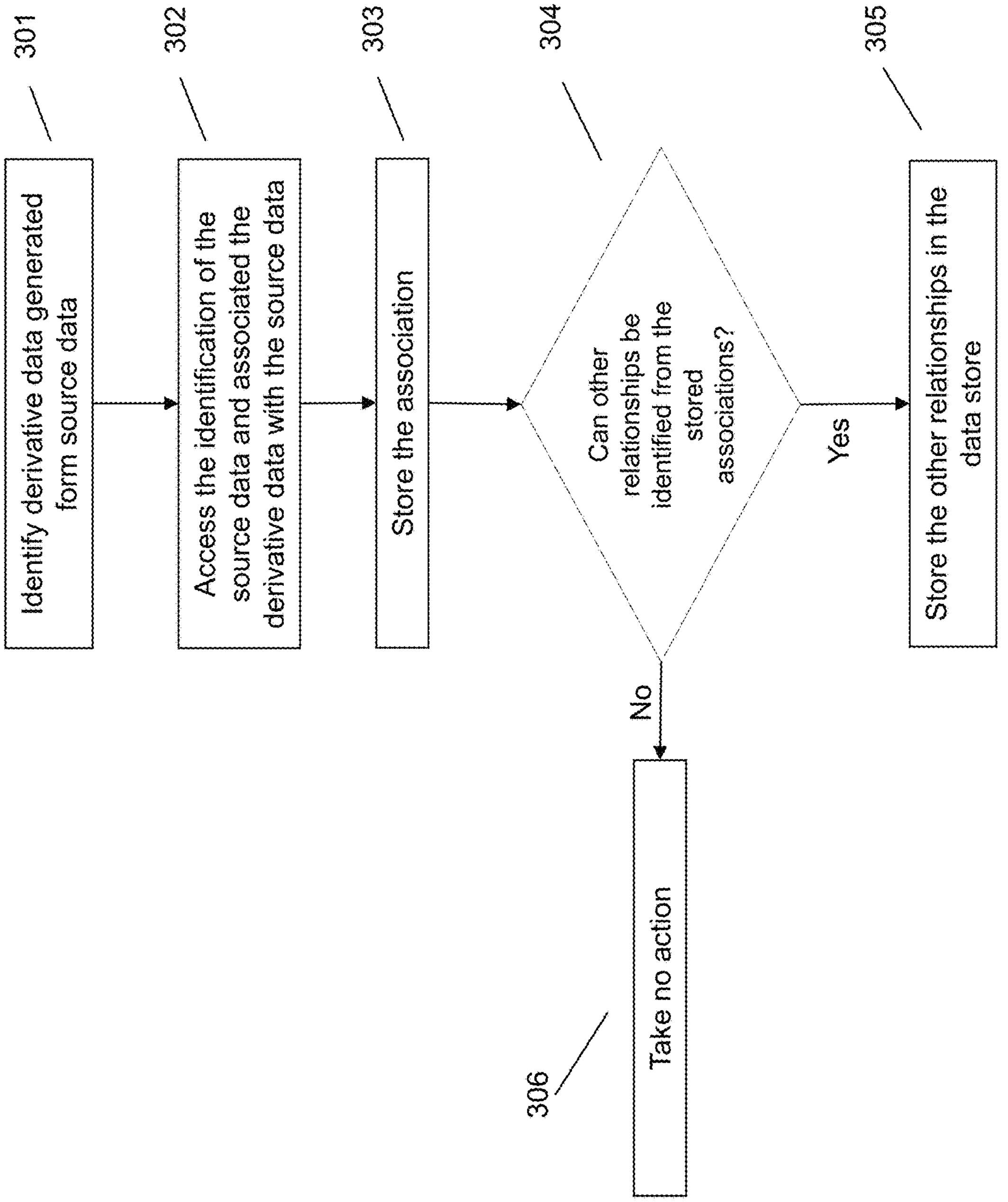
FIG. 3 illustrates an example method for identifying and storing relationships between source data and derivative data through accessing identifications or source data added to the derivative data.

FIG. 3 illustrates an example method for identifying and storing relationships between source data and derivative data through accessing identifications or source data added to the derivative data. The method may be implemented on a system which includes a processor, memory device, output devices (e.g., display device, printer, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the system itself is specifically programmed to perform the functions as described herein to identify and store relationships between source data and derivative data. Additionally, the data relationship identification system includes modules and features that are unique to the described system.

The data relationship identification system may include one or more components or modules that can perform the functions described herein. One component may be a data store. The data store stores the associations and relationships between data, processes, components, systems, and the like. The data store may also store derivative data, source data, pointers or links to derivative data and/or source data, and/or the like. The data store may also store other information related to the data relationship identification system, data within or accessible by the data relationship identification system, and/or the like.

Another component may include a central management system. The central management system tracks and traces data as it is processed through a processing system. Thus, the central management system can track source data as it is processed through one or more data processing components and identify what data is generated from the source data (i.e., derivative data) by the one or more processing components. Accordingly, the central management system knows to which source data derivative data corresponds. The central management system also knows what processing components processed the source data, what processing components further processed derivative data, where source data and/or derivative data is or was stored, and any other movements and/or manipulations of source and/or derivative data. To perform the tracking and tracing of the source and/or derivative data, the central management system may employ the systems and methods as described herein.

The data relationship identification system may include or interface with a data processing system. The data processing system may be a component or system that is included within the data relationship identification system. Alternatively, the data processing system may be a stand-alone system that is in operative communication with the data relationship identification system. The data processing system may communicate with the data relationship identification system through the central management system. Since the central management system is able to track data as it is processed through one or more data processing components, the central management system may either be a part of the data relationship identification system that communicates with the data processing system to track the data as it is processed or may be a part of the data processing system that communicates with the data relationship identification system to provide the tracking information of the data. An example data processing system is described in commonly-owned application having Ser. No. 17/825,475, entitled "DISTRIBUTED AND PARALLEL PROCESSING OF DATA" and filed on the same day as this application, the contents of which are incorporated by reference herein as if set forth fully herein. Additionally, an example central management system that may provide instruction to different modules is described in commonly-owned application Ser. No. 17/825,166, entitled "CENTRAL SYSTEM FOR COMPUTER SYSTEM SECURITY ASSESSMENT" and filed on the same day as this application, the contents of which are incorporated by reference herein as if set forth fully herein.

At 301, the data relationship identification system identifies derivative data generated from source data. The data relationship identification system tracks data, for example, using the central management system, as it flows through the data processing system. Thus, the data relationship identification system identifies data processing components that receive source data for processing. Once the processing components generate an output from the source data, for example, by processing the source data, the data relationship identification system can identify that output data, referred to as derivative data, corresponds to the source data. In other words, the data relationship identification system identifies that the output from a data processing component is data that was derived from and has a relationship to the source data.

While the derivative data is being generated or after it is generated, the data lineage system may facilitate the inclusion of an identification of the source data with the derivative data. The facilitation may include providing instructions to the data processing component to add the identification to the derivative data while it is being generated. Additionally, or alternatively, the facilitation may include the data relationship identification system adding the identification of the source data to the derivative data, for example, using the central management system. Thus, when the derivative data is generated, an identification of the source data corresponding to the derivative data is added to the derivative data.

The identification of the source data may include a unique identifier associated with the source data, for example, a file name, a unique identification number or identifier, a hash, and/or any other identification that can identify or be used to identify the source data. It should be noted that since the data processing system may be a distributed and parallel computing system for processing data, more than one processing component may process the same source data simultaneously. Thus, the identification that is added to derivative data of the source data should be the same across all derivative data of the source data. Accordingly, the technique for creating the identification is consistent at least across the source data, but is likely consistent across all data. However, consistency across all data is not strictly necessary. For example, the source-derivative data relationships may be inherited. Adding the identification may include marking the derivative data with the identification, adding the identification to the metadata of the derivative data, updating an attribute of the derivative data with the identification, adding a pointer to the source data to the derivative data, a combination thereof, or any other technique that can be used to add the identification to the derivative data.

At 302, the data relationship identification system accesses the identification of the source data within the derivative data and associates the derivative data with the source data based upon the identification included with the derivative data. In other words, the data relationship identification system accesses the identification within the derivative data to identify the source data corresponding to the derivative data. Using the identification, the data relationship identification system associates the derivative data with the source data, meaning the system identifies that a relationship exists between the derivative data and the source data. In this case, the relationship is a direct relationship since the derivative data is a direct descendent of the source data, specifically, a child of the source data.

Other direct relationships may be identifiable from the identification included in the derivative. For example, as subsequent generation derivative data is made from source data (e.g., derivative data generated from derivative data generated from source data), the identification may include identification of both the first-generation, or previous-generation, derivative data and the source data. Thus, accessing the identification and associating the derivative data with source data may include associating derivative data with other direct derivative data and an original source data. In other words, since the identification may include not only an identification of the data the derivative data was generated from, which may be derivative data itself, but may also include an identification of any preceding data including previous generation derivative data and original source data. If included, the system will associate the derivative data with any other data that is included in the identification, which may be more than one identification.

Making the associations may include marking the source data and/or derivative data with the association, making an entry of the association within a ledger, report, data store, and/or the like. While making the associations may include other actions, it includes at least storing, at 303, the association of the derivative data with the source data in a data store, for example, the data store previously discussed. It should be noted that when the term "source data" is used it is referring to the data from which the derivative data is directly derived. In other words, the source data is the data that was used to generate the derivative data. Thus, the source data may itself be derivative data that was derived from its own source data. The starting source data is referred to as the original source data. The original source data is the data in its raw form and is generally the data that was originally received at the data processing system.

Storing the association may include adding the association to an entry within the data store where the entry correlates the derivative data with the source data. The entry may also identify other information relating to the association, for example, the type of relationship (direct, indirect, child, grandchild, generation number of the derivative data, etc.), a link or pointer to the derivative data and/or source data, identification of the process or processing component that generated the derivative data, an identification of any other derivative data intervening between the derivative data and an original source data, and/or the like. Thus, for example, the association may include not only storing the association of the source data to the derivative data, but also storing the association of the source data, if it is also derivative data, to its source data and the associations linking the derivative data to original source data.

Other things may also be stored in the data store, for example, the source data, the derivative data, identification of the data processing system, and/or the like. In the case that the source data and/or derivative data is stored in the data store, the association may be stored with the source data and/or derivative data. The storing of the association with the data, either source or derivative, may be in addition to the storage of the association within the data store, for example, in a data ledger, a lineage tree (meaning a lineage from the source-derivative data and other data relationships), and/or the like. Alternatively, the storing of the association with the data, either source or derivative, may be instead of storing the association within the data store, for example, in a data ledger, a lineage tree, and/or the like.

Once the associations are stored in the data store, the data relationship identification system can perform additional functions that utilize the associations. One function includes identifying if other relationships can be identified from the stored associations at 304. The associations identify direct relationships between derivative data and source data including a direct parent-child relationship and also subsequent-generation relationships, for example, second-generation derivative data, third-generation derivative data, and the like. However, from the associations, other indirect relationships can be identified. These are relationships that are inferred from the direct relationships and associations. The inferred relationships can be inferred by identifying similarities between two or more data, either source, derivative, or a combination thereof, attributes. The similarities can be identified from attributes of the data itself, attributes of associations, and/or the like.

As an example, a similarity may be identified between associations of derivative data to source data. Associations of multiple derivative data to a single source data indicate a similarity of the source data for the multiple derivative data. Thus, in this example, the similarity is the source data. If multiple derivative data are derived from the same source data, the multiple derivative data have an indirect relationship due to the relationship to the same common source data. In other words, the multiple derivative data were all generated from the same source data. Similarly, multiple source data having associations to the same or similar derivative data indicate a similarity of the derivative data for the multiple source data. Thus, the multiple source data have an indirect relationship due to the relationship to the same or similar common derivative data.

As another example, a similarity may be identified from other information stored with the associations. Other information may include an identification of processes generating the derivative data, systems providing the source data, processing the derivative data, storing the source and/or derivative data, and/or the like, a time of generation of the derivative data, and/or like. From this information, indirect relationships can be identified between objects other than the data. As an example, indirect relationships can be inferred for processes, systems, components, and/or the like, that are used to generate derivative data, process source data, and/or the like.

Similarities between processes, systems, components, and/or the like (referred to collectively as processes for ease of readability), that generate derivative data or process source data can identify an indirect relationship between processes. For example, if two processes generate the same or similar derivative data, the processes have an indirect relationship due to the associated derivative data. As another example, if source data and derivative data are both processed through a single common process, the source data and derivative data have an indirect relationship due to the relationship to the common process. Similarly, if multiple derivative data are processed through a single common process, the multiple derivative data have an indirect relationship due to the relationship to the common process. These are merely examples of inferring relationships between data, processes, and/or the like, from example information. However, these are not the only techniques for inferring relationships between data, processes, and/or the like.

If other relationships cannot be identified for a derivative data or source data at 304, the data relationship identification system will take no action at 306. In other words, the data relationship identification system will take no action with respect to the derivative data or source data and may attempt to identify if other relationships for other derivative data or source data can be identified. As new associations and/or data are added to the data store, the data relationship identification system can attempt to determine if other relationships can be identified for the derivative data or source data. In other words, if other relationships cannot be identified for derivative data or source data at one point in time, this does not mean that the system will not try to identify other relationships for the derivative data or source data at another point in time.

On the other hand, if other relationships can be identified for derivative data or source data at 304, the data relationship identification system may store the newly identified other relationships in the data store at 305. These newly identified relationships can be used to identify other relationships. In other words, as new relationships are identified and stored within the data store, other new relationships can be identified and stored. Thus, the data relationship identification system is able to continually identify new relationships and associations between data, processes, and the like, as new data, processes, relationships, associations, and the like, are added to the data store.

Another function that the data relationship identification system can perform is to generate a lineage tree for a source data and derivative data that has been generated from the source data. The lineage tree not only includes first-generation derivative data, but also includes subsequent-generation derivative data. Thus, the lineage tree is like a family tree for an original source data. The lineage tree can also include any identified indirect relationships for the source data. Lineage trees can also be generated for processes. To create the lineage trees, the data relationship identification system accesses the data store and identifies associations corresponding to the subject of the lineage tree (e.g., the original source data, an identified process, etc.). From the associations, the data relationship identification system can populate the lineage tree.

The data relationship identification system can also verify an accuracy of derivative data in the data store by tracing the derivative data back to an originating source data through the stored associations and identifiers. If there is a question about an accuracy of derivative data, whether the derivative data was processed or generated correctly, and/or the like, the data relationship identification system can be utilized to verify this information. The derivative data and associations of the derivative data can be accessed. The derivative data can then be traced backwards to the original source data. When tracing the derivative data back, the system will encounter or identify the processes, components, systems, and/or the like, that were utilized to generate the derivative data. Identification of these processes, components, systems, and/or the like, allow the data relationship identification system to rerun the process, component, system, and/or the like, to make sure that the same derivative data is generated, thus verifying the generation and accuracy of the derivative data.

The identified associations and relationships within the data lineage system can allow one or more systems, including the data lineage system, a user, an entity, or the like, to make decisions regarding future information or data. For example, the associations and relationships can be used to determine what processes or processing components should be used to process new source data. For example, if the data lineage system indicates that two processes or processing components have an indirect relationship due to similar derivative data, a system or user may choose to only provide the source data to one of the processes to reduce the creation of redundant derivative data. As another example, if the data lineage system indicates that certain processes generally generate derivative data for a type of source information, a system or user may choose to provide similar source data to only those processes to reduce the amount of processing that is performed that does not result in generation of derivative data.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for identifying and storing relationships between source data and derivative data, the method comprising:

identifying, while tracking source data as it is processed in a data processing system, at least one output created from the source data, wherein each of the at least one output is derivative data of the source data;

including, within each of the derivative data, an identification of the source data from which each of the derivative data was created, wherein each piece of derivative data created from the same source data includes the same identification of the source data;

accessing, using a data relationship identification system, at least a portion of the derivative data and accessing, from each of the derivative data accessed, the identification of the source data included within the derivative data and identifying a relationship between the derivative data and the source data based upon the identification;

inferring, from relationships of derivative data and source data stored within a data store, indirect relationships between the derivative data and the source data and other derivative data and other source data;

wherein the inferring comprises determining indirect relationships between the source data and the derivative data by identifying a single common process that was used to process both the source data and the derivative data and determining indirect relationships between two processes that were used to generate the same or similar derivative data; and selecting, for processing of subsequent data and based upon the indirect relationships and the relationships stored within the data store, processes within the data processing system for processing the subsequent data.

2. The method of claim 1, wherein the including of the identification of the source data to the derivative data comprises adding the identification of the source data to metadata of the derivative data.

3. The method of claim 1, comprising generating a lineage tree for a given source data and derivative data generated from the given source data, wherein the generating comprises accessing the data store and identifying the relationships corresponding to the given source data and derivative data associated with the given source data.

4. The method of claim 1, wherein the inferring relationships comprises identifying indirect relationships through common source data and derivative data.

5. The method of claim 1, wherein the relationships of derivative data and source data stored within the data store comprise relationships of the source data to other source data in addition to the relationship of the derivative data and the source data and linking the relationships.

6. The method of claim 1, comprising verifying an accuracy of a derivative data in the data store by tracing the derivative data back to an originating source data through the stored relationships and identifiers.

7. The method of claim 1, wherein the including comprises including the identification during generation of each of the derivative data.

8. The method of claim 1, wherein the tracking is performed by a central management system of the data relationship identification system and wherein the central management system identifies the derivative data and source data and adds the identification to the derivative data.

9. A system for identifying and storing relationships between source data and derivative data, the system comprising:

a processor;

a memory device that stores instructions that, when executed by the processor, causes the system to:

identify, while tracking source data as it is processed in a data processing system, at least one output created from the source data, wherein each of the at least one output is derivative data of the source data;

include, within each of the derivative data, an identification of the source data from which each of the derivative data was created, wherein each piece of derivative data created from the same source data includes the same identification of the source data;

access, using a data relationship identification system, at least a portion of the derivative data and accessing, from each of the derivative data accessed, the identification of the source data included within the derivative data and identifying a relationship between the derivative data and the source data based upon the identification;

infer, from relationships of derivative data and source data stored within a data store, indirect relationships between the derivative data and the source data and other derivative data and other source data:

wherein the inferring comprises determining indirect relationships between the source data and the derivative data by identifying a single common process that was used to process both the source data and the derivative data and determining indirect relationships between two processes that were used to generate the same or similar derivative data; and select, for processing of subsequent data and based upon the indirect relationships and the relationships stored within the data store, processes within the data processing system for processing the subsequent data.

10. The system of claim 9, wherein the including of the identification of the source data to the derivative data comprises adding the identification of the source data to metadata of the derivative data.

11. The system of claim 9, comprising generating a lineage tree for a given source data and derivative data generated from the given source data, wherein the generating comprises accessing the data store and identifying the relationships corresponding to the given source data and derivative data associated with the given source data.

12. The system of claim 9, wherein the inferring relationships comprises identifying indirect relationships through common source data and derivative data.

13. The system of claim 9, wherein the relationships of derivative data and source data stored within the data store comprise relationships of the source data to other source data in addition to the relationship of the derivative data and the source data and linking the relationships.

14. The system of claim 9, comprising verifying an accuracy of a derivative data in the data store by tracing the derivative data back to an originating source data through the stored relationships and identifiers.

15. The system of claim 9, wherein the including comprises including the identification during generation of each of the derivative data.

16. A product for identifying and storing relationships between source data and derivative data, the product comprising:

a computer-readable storage device that stores executable code that, when executed by a processor, causes the product to:

identify, while tracking source data as it is processed in a data processing system, at least one output created from the source data, wherein each of the at least one output is derivative data of the source data;

include, within each of the derivative data, an identification of the source data from which each of the derivative data was created, wherein each piece of derivative data created from the same source data includes the same identification of the source data;

access, using a data relationship identification system, at least a portion of the derivative data and accessing, from each of the derivative data accessed, the identification of the source data included within the derivative data and identifying a relationship between the derivative data and the source data based upon the identification;

infer, from relationships of derivative data and source data stored within a data store, indirect relationships between the derivative data and the source data and other derivative data and other source data;

wherein the inferring comprises determining indirect relationships between the source data and the derivative data by identifying a single common process that was used to process both the source data and the derivative data and determining indirect relationships between two processes that were used to generate the same or similar derivative data; and select, for processing of subsequent data and based upon the indirect relationships and the relationships stored within the data store, processes within the data processing system for processing the subsequent data.

* * * * *